US010644561B2

(12) United States Patent
Abe et al.

(10) Patent No.: US 10,644,561 B2
(45) Date of Patent: May 5, 2020

(54) STATOR STRUCTURE AND RESOLVER

(71) Applicant: MINEBEA MITSUMI Inc., Nagano (JP)

(72) Inventors: Hiroshi Abe, Shizuoka (JP); Naohiro Yamada, Kanagawa (JP); Mutsumi Matsuura, Shizuoka (JP)

(73) Assignee: MINEBEA MITSUMI, INC., Nagano (JP)

( * ) Notice: Subject to any disclaimer, the term of this patent is extended or adjusted under 35 U.S.C. 154(b) by 398 days.

(21) Appl. No.: 15/716,989

(22) Filed: Sep. 27, 2017

(65) Prior Publication Data
US 2018/0097421 A1    Apr. 5, 2018

(30) Foreign Application Priority Data

Sep. 30, 2016   (JP) ................................. 2016-194672
Mar. 27, 2017   (JP) ................................. 2017-061529

(51) Int. Cl.
*H02K 5/08*      (2006.01)
*H02K 3/34*      (2006.01)
*H02K 1/16*      (2006.01)
*H02K 3/32*      (2006.01)
*H02K 3/48*      (2006.01)
H02K 5/22        (2006.01)

(52) U.S. Cl.
CPC ................ *H02K 5/08* (2013.01); *H02K 1/16* (2013.01); *H02K 3/32* (2013.01); *H02K 3/34* (2013.01); *H02K 3/48* (2013.01); *H02K 5/225* (2013.01); *H02K 2203/09* (2013.01)

(58) Field of Classification Search
CPC .. H02K 5/08; H02K 1/16; H02K 3/32; H02K 3/34; H02K 3/48; H02K 5/225; H02K 2203/09
See application file for complete search history.

(56) References Cited

U.S. PATENT DOCUMENTS 7,309,936 B2 *  12/2007  Utsumi ................ G01D 5/2046
                                                  310/254.1
7,595,572 B2 *   9/2009  Haga ...................... H02K 3/522
                                                      310/194
7,884,514 B2 *   2/2011  Baumgartner ......... H02K 3/522
                                                       310/71
(Continued)

FOREIGN PATENT DOCUMENTS

JP    2016-116426 A    6/2016

*Primary Examiner* — Jue Zhang
(74) *Attorney, Agent, or Firm* — Pearne & Gordon LLP

(57) ABSTRACT

A stator structure according to an embodiment includes a stator core having a plurality of teeth; insulators configured to cover the teeth; a coil wound around each of the teeth with the insulators interposed therebetween; and first and second coil covers configured to cover the coil, each of the first and second coil covers being formed in an annular shape. The insulators have respective flange parts configured to cover respective distal end portions of the teeth. Each of the first and second coil covers has a first peripheral wall. The first peripheral wall of the first coil cover and the flange part located on one side of the insulator are arranged to face each other with a space therebetween. The first peripheral wall of the second coil cover and the flange part located on the other side of the insulator are arranged to face each other with a space therebetween.

9 Claims, 10 Drawing Sheets

(56) References Cited

U.S. PATENT DOCUMENTS 8,692,424 B2 * 4/2014 Bohrer .................. H02K 3/522
                                                    29/596
9,318,927 B2 * 4/2016 Kim ........................ H02K 1/12

* cited by examiner

STATOR STRUCTURE AND RESOLVER

CROSS-REFERENCE TO RELATED APPLICATION(S)

The present application claims priority to and incorporates by reference the entire contents of Japanese Patent Application No. 2016-194672 filed in Japan on Sep. 30, 2016 and Japanese Patent Application No. 2017-061529 filed in Japan on Mar. 27, 2017.

BACKGROUND OF THE INVENTION

1. Field of the Invention

The present invention relates to a stator structure and a resolver.

2. Description of the Related Art

There has been known a resolver as a rotational angle sensor. The resolver is constituted of a stator provided with a plurality of teeth that radially extend from a ring-shaped stator core, and a rotor arranged to face the teeth of the stator in an opposed manner. A stator winding is wound around each of the teeth with insulators interposed therebetween to form a coil. The stator winding is constituted of an excitation winding that inputs an excitation signal thereto, and two detection windings, the respective detection windings being configured to output two phase signals depending on the rotational angle of the rotor. The respective detection windings output therefrom a sine-phase signal dependent on sin θ, and a cosine-phase signal dependent on cos θ. In the resolver, there has been known a structure in which two coil covers (protective covers) covering the stator windings are mounted on both sides of the stator core in order to prevent foreign materials, such as swarf, from entering into a stator-winding (coil) side of the resolver even when the resolver is, for example, used in oil (see Japanese Laid-open Patent Publication No. 2016-116426).

In the above-mentioned constitution, for example, a first bent part and a second bent part are formed in a first ring-shaped coil cover and a second ring-shaped coil cover that are provided to both end faces of a ring-shaped stator, respectively, and a third bent part and a fourth bent part are formed in a first ring-shaped insulation cover and a second ring-shaped insulation cover that are provided to both end faces of the ring-shaped stator, respectively. Furthermore, in the above-mentioned constitution, the first bent part and the second bent part are brought into contact with the third bent part and the fourth bent part, respectively, thus preventing the foreign-materials from entering from the outside into the stator coil side of the resolver.

However, in the above-mentioned constitutional example, the first ring-shaped coil cover, the second ring-shaped coil cover, the first ring-shaped insulation cover, and the second ring-shaped insulation cover are members each of which is formed of a resin material and hence, it is difficult to manufacture each member with high dimensional accuracy. Accordingly, in order to prevent the entering of the foreign materials by bringing the first bent part and the third bent part into contact with each other so as to cover the entire circumference of the third bent part, and bringing the second bent part and the fourth bent part into contact with each other so as to cover the entire circumference of the fourth bent part, it is necessary to bring these paired members into contact with each other with a predetermined pressure. As a result, one of the paired members or both of the paired members may be deformed, and there exists the possibility that the reliability of the resolver is lowered.

SUMMARY OF THE INVENTION

A stator structure according to one embodiment of the present invention includes a stator core having a plurality of teeth extending from a body part of the stator core in a radial direction, the body part being formed in an annular shape; insulators configured to cover the teeth from both sides in an axial direction; a coil wound around each of the teeth with the insulators interposed therebetween; and first and second coil covers configured to cover the coil from both sides in the axial direction, each of the first and second coil covers being formed in an annular shape. The insulators have respective flange parts configured to cover respective distal end portions of the teeth from both sides in the axial direction. Each of the first and second coil covers has a first peripheral wall extending in the axial direction. The first peripheral wall of the first coil cover and the flange part located on one side of the insulator in the axial direction are arranged to face each other with a space therebetween. The first peripheral wall of the second coil cover and the flange part located on the other side of the insulator in the axial direction are arranged to face each other with a space therebetween.

DETAILED DESCRIPTION OF THE PREFERRED EMBODIMENTS

Hereinafter, a stator structure and a resolver according to embodiments are explained with reference to drawings.

First Embodiment

Figure 1:
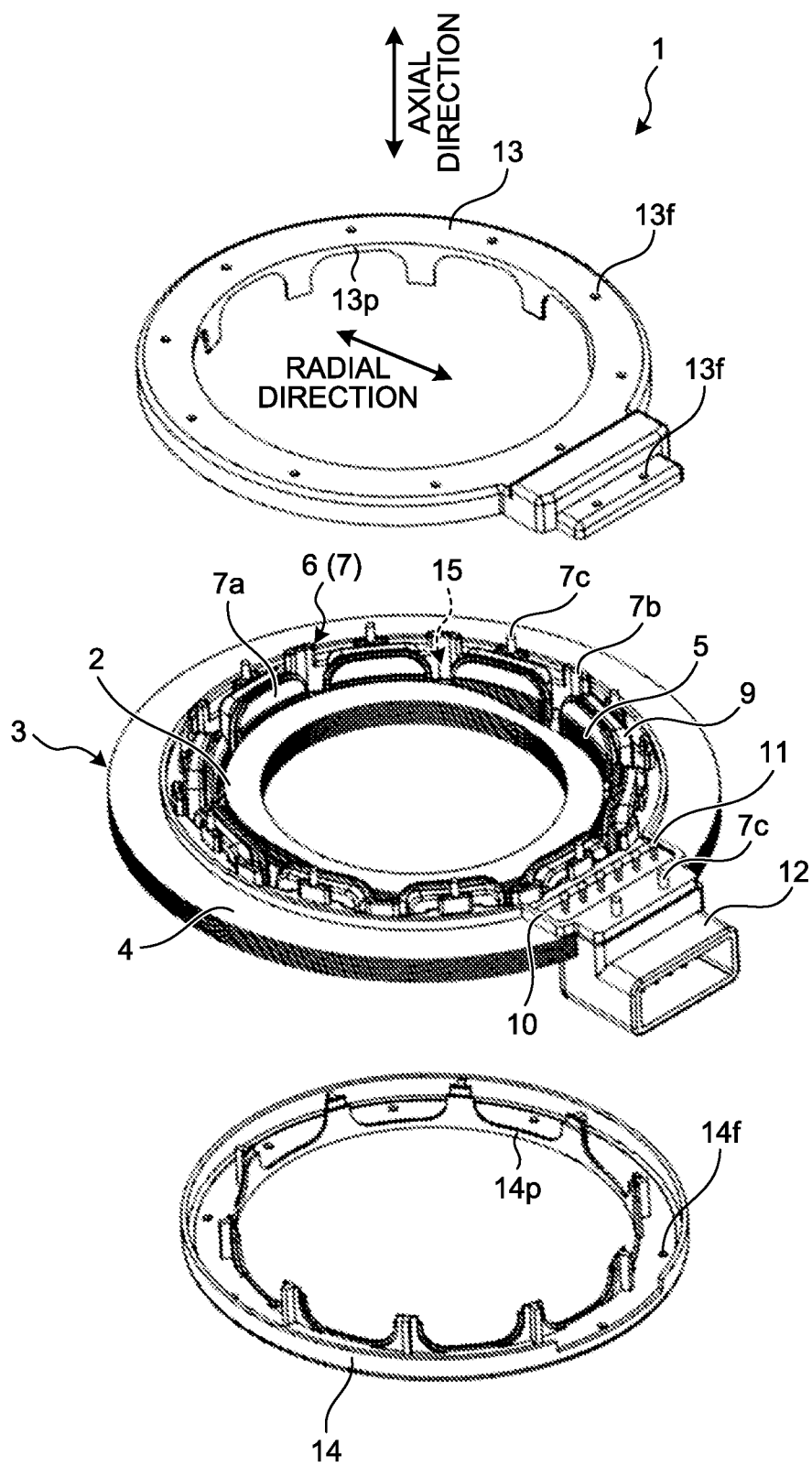
FIG. 1 is a schematic exploded perspective view of a resolver according to a first embodiment.

FIG. 1 is a schematic exploded perspective view of a resolver according to a first embodiment. As illustrated in FIG. 1, a resolver 1 according to the first embodiment is a variable reluctance (VR) type resolver having a rotor 2, a stator 3, a first coil cover 13, and a second coil cover 14. The stator 3, the first coil cover 13, and the second coil cover 14 constitute a stator structure.

The rotor 2 has a laminated structure in which a plurality of steel-sheet cores each of which is composed of a soft magnetic material, such as a silicon steel sheet, are laminated to each other, the rotor 2 being attached to a rotational shaft of a motor (not illustrated in the drawings) and arranged in the inside of the stator 3. An axial direction illustrated in FIG. 1 coincides with the axial direction of the rotational shaft of the motor connected with the rotor 2. Furthermore, as illustrated in FIG. 1, a radial direction coincides with the direction orthogonal to the axial direction. Here, the radial direction indicates any directions parallel to the surface orthogonal to the axial direction. In FIG. 1, one of the radial directions is indicated by a double-headed arrow.

The stator 3 has a stator core 4, a coil 9, and an insulator 6. The stator core 4 is constituted of a predetermined number of steel-sheet cores each of which is composed of a soft magnetic material, such as a silicon steel sheet, the steel-sheet cores being laminated to each other in the axial direction. The stator core 4 has a plurality of teeth 5 that extend in the radial direction from an annular part that is an annular body part. In the present embodiment, the resolver 1 is an inner rotor type resolver, and the stator core 4 has the teeth 5 that extend inward from the annular part that is the annular body part in the radial direction. In the present embodiment, although the stator core 4 has ten teeth 5, the number of the teeth 5 is not particularly limited. The teeth 5 are arranged at equal angle intervals in a circumferential direction of the annular part, and each of teeth 5 has a distal end portion that extends in the circumferential direction. There is a space (slot 15) formed between every two teeth 5.

The coil 9 is a winding wound around each of the teeth 5 with the insulator 6 interposed therebetween. The coil 9 is constituted of an excitation winding that inputs an excitation signal therein, and a detection winding that outputs two-phase signals depending on the rotational angle of the rotor 2, the detection winding being constituted of a sin-θ detection winding from which a sine-phase signal dependent on sin θ is output, and a cos-θ detection winding from which a cosine-phase signal dependent on cos θ is output.

The insulator 6 is formed by injection molding with the use of an insulation resin material. The insulator 6 is constituted of a first insulator 7 and a second insulator 8 that cover the teeth 5 of the stator core 4 from both sides in the axial direction. Furthermore, the insulator 6 has flange parts (flange parts 7a and flange parts 8a) that cover respective distal ends of the teeth 5 of the stator core 4 from both sides in the axial direction. Here, in FIG. 1, as for the insulator 6, the first insulator 7 attached to the teeth 5 from above is illustrated, and the second insulator 8 attached to the teeth 5 from below is not illustrated.

The insulator 6 is provided with a terminal block part 10 that extends in the radial direction of the stator core 4. In the present embodiment, the first insulator 7 is provided with the terminal block part 10 that extends outward in the radial direction of the stator core 4. The terminal block part 10 includes a plurality of terminals 11 (six terminals 11 in FIG. 1) implanted thereinto, and a female connector housing 12 formed therein. The terminal block part 10 can be formed simultaneously with the first insulator 7. One end of each terminal 11 twines therearound an end of a winding that constitutes the corresponding coil 9, and the other end of each terminal 11 is projected into the inside of the connector housing 12. The other end of each terminal 11 is connected with an external connector. The first insulator 7 and the terminal block part 10 are integrally formed with each other by injection molding with the use of an insulation resin material.

The first insulator 7 is provided with a plurality of arms (ten arms in FIG. 1) each of which extends inward from an annular part in the radial direction. The flange part 7a is provided to the distal end of each arm. The arm of the first insulator 7 is attached to a part (upper side) of each of the teeth 5 of the stator core 4. The flange part 7a covers the upper side of the distal end portion of each of the teeth 5 to prevent the winding (coil 9) wound around the arm from winding deformation. There is a cross pin 7b that supports a jumper wire of the winding that constitutes the coil 9, the cross pin 7b being integrally formed with a root (inner part of slot 15) located between the arms adjacent to each other. In the present embodiment, ten cross pins 7b are formed.

Furthermore, there is a resin pin 7c that is integrally formed with the annular part located on the root of the arm of the first insulator 7. In FIG. 1, ten resin pins 7c are formed in the annular part of the first insulator 7 at equal angle intervals. In addition, two resin pins 7c are integrally formed with the terminal block part 10 on the outer peripheral side of the terminal 11. That is, in one example illustrated in FIG. 1, a total of twelve resin pins 7c are formed in the first insulator 7. The resin pin 7c is described below.

The second insulator 8 is, in the same manner as the first insulator 7, provided with a plurality of arms (ten arms in the present embodiment) that extend inward from an annular part in the radial direction. The flange part 8a is provided to the distal end of each arm. The arm of the second insulator 8 is attached to a part (lower side) of each of the teeth 5 of the stator core 4. The flange part 8a covers the lower side of the distal end portion of each of the teeth 5 to prevent the winding (coil 9) wound around the arm from winding deformation. Furthermore, there are resin pins 8c described below, the resin pins 8c being integrally formed with the annular part located on a root of the arm of the second insulator 8. In the present embodiment, ten resin pins 8c are formed in the annular part of the second insulator 8 at equal angle intervals. Furthermore, in the present embodiment, ten resin pins 8c are formed in the second insulator 8 so that the resin pins 8c are located on respective places identical with the places on which ten resin pins 7c are located when the first insulator 7 and the second insulator 8 are attached to the stator core 4.

Here, in FIG. 1, although the cross pin 7b according to the present embodiment is formed in the first insulator 7, the cross pin 7b may be formed in the second insulator 8. Furthermore, the respective positions at which the resin pins 7c and the resin pins 8c are formed are not limited to the case above. For example, the resin pin 7c may be formed on the cross pin 7b. Furthermore, for example, when the cross pin 7b is formed in the second insulator 8, the resin pin 8c may be formed on the cross pin 7b. In this case, compared with the constitution in which the resin pins 7c and the resin pins 8c are formed in the respective roots of the arms, the degree of freedom of nozzle movements in a coil winding machine when the winding is wound around the arm becomes high. Furthermore, when the degree of freedom of the outside dimension of the insulator 6 is high, the resin pin 7c may be formed on a place closer to the outer peripheral side than the cross pin 7b, and the position of the resin pin 7c is not particularly limited. In this case, the nozzle movements in the coil winding machine when the winding is wound around the arm are not restricted.

Furthermore, in one example mentioned above, although the insulator 6 is constituted of the first insulator 7 and the second insulator 8, the insulator 6 may be integrally formed with the stator core 4 by insert molding. That is, the first insulator 7 and the second insulator 8 may be integrally formed with each other so as to constitute the insulator 6. Furthermore, in one example mentioned above, although the first insulator 7 and the terminal block part 10 are integrally formed with each other by injection molding, a constitution in which the terminal block part 10 formed as a separate member is attached to the first insulator 7 may be adopted. In addition, the present embodiment may adopt a constitution in which the connector housing 12 is not formed.

Figure 2:
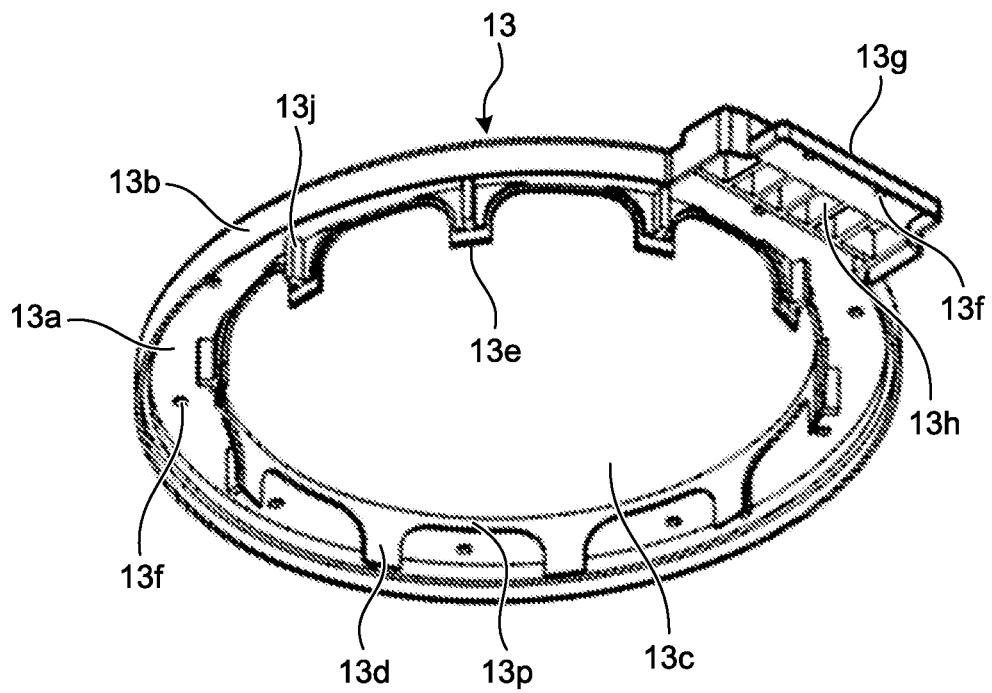
FIG. 2 is a perspective view of a first coil cover illustrated in FIG. 1.
Figure 3:
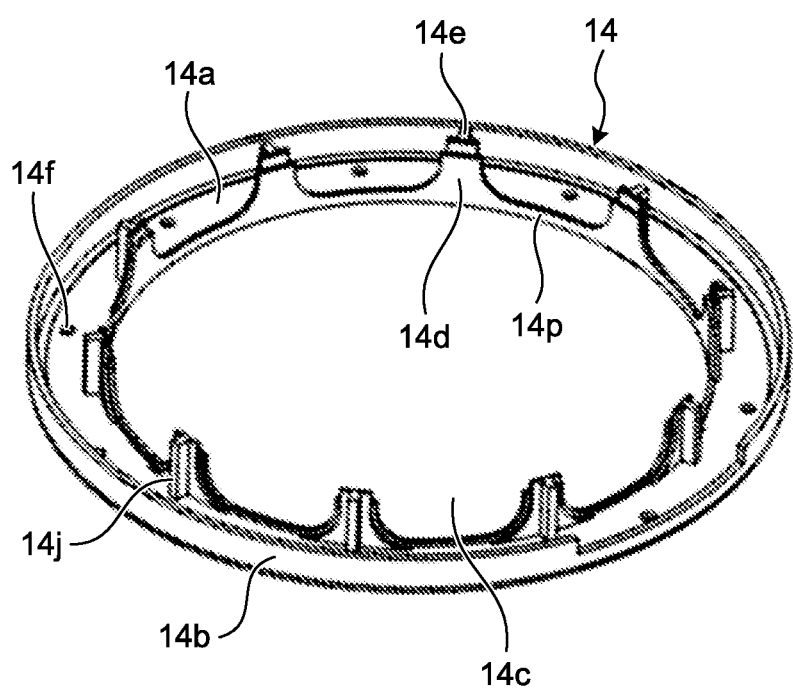
FIG. 3 is a perspective view of a second coil cover illustrated in FIG. 1.

Next, the first coil cover 13 and the second coil cover 14 are explained in conjunction with FIG. 2 and FIG. 3 in addition to FIG. 1. FIG. 2 is a perspective view of the first coil cover illustrated in FIG. 1, and FIG. 3 is a perspective view of the second coil cover illustrated in FIG. 1.

Although the constituent material of each of the first coil cover 13 and the second coil cover 14 is not limited, each of the first coil cover 13 and the second coil cover 14 in the present embodiment is composed of a resin material and, for example, formed by injection molding with the use of a resin material. As the resin material, an insulation resin material or the like can be used. The first coil cover 13 and the second coil cover 14 cover the coil 9 from both sides of the stator core 4 in the axial direction to protect the coil 9. As illustrated in FIG. 1, the first coil cover 13 is attached to the stator core 4 from the upper side of the coil 9, and the second coil cover 14 is attached to the stator core 4 from the lower side of the coil 9.

As illustrated in FIG. 2, the first coil cover 13 having a ring part 13a that constitutes the body of the first coil cover 13 is formed in an annular shape as a whole, and the ring part 13a is provided with an outer peripheral wall 13b that is arranged on the outer periphery of the ring part 13a, and extends in the axial direction. In a part of the outer peripheral wall 13b, a terminal block cover part 13g that covers the terminal block part 10 mentioned above is formed.

The terminal block cover part 13g that covers the terminal block part 10 has a plurality of separation members (partition plate) formed in the inside of the terminal block cover part 13g, and the respective terminals 11 are housed in a plurality of spaces 13h formed by the separation members in a spaced-apart manner. The constitution such that the terminal 11 is housed in the space 13h is capable of preventing an electrical short circuit between the terminals 11 due to foreign materials entered into the inside of the stator structure.

As illustrated in FIG. 3, the second coil cover 14 having a ring part 14a that constitutes a body of the second coil cover 14 is formed in an annular shape as a whole, and the ring part 14a is provided with an outer peripheral wall 14b that is arranged on the outer periphery of the ring part 14a, and extends in the axial direction. The inside diameter and the outside diameter of the ring part 14a of the second coil cover 14 are approximately the same as the inside diameter and the outside diameter of the ring part 13a of the first coil cover 13, respectively.

To explain the first coil cover 13 also in conjunction with FIG. 2, a plurality of through holes 13f are formed in the ring part 13a of the first coil cover 13 at even pitch intervals in the circumferential direction, and the through holes 13f are also formed on the outer periphery side of the terminal block cover part 13g. In the present embodiment, ten through holes 13f are formed in the ring part 13a, and two through holes 13f are formed in the terminal block cover parts 13g. The through holes 13f of the ring part 13a are formed at intervals equal to intervals at which the resin pins 7c are formed in the annular part of the first insulator 7. The through holes 13f of the terminal block cover part 13g are formed at intervals equal to intervals at which the resin pins 7c are formed in the terminal block part 10.

Furthermore, as illustrated in FIG. 3, a plurality of through holes 14f are formed in the ring part 14a of the second coil cover 14 at even pitch intervals in the circumferential direction. In the present embodiment, ten through holes 14f are formed in the ring parts 14a. The through holes 14f of the ring part 14a are formed at intervals equal to intervals at which the resin pins 8c formed in the annular part of the second insulator 8.

To explain the first coil cover 13 also in conjunction with FIG. 2, a plurality of projection portions 13d are formed on the periphery of an opening 13c in the center of the first coil cover 13, the projection portion 13d extending in the axial direction in the same manner as the case of the outer peripheral wall 13b. Each of the projection portions 13d includes a stepped portion 13e formed in the distal end thereof. In the present embodiment, ten projection portions 13d are formed in the circumferential direction at even pitch intervals. The projection portion 13d has a shape with a width gradually increased toward the ring part 13a side of the first coil cover 13 in the circumferential direction, in conformity with the external shape of the flange part 7a. Furthermore, the first coil cover 13 is provided with an inner peripheral wall 13p that is arranged between the projection portions 13d adjacent to each other so as to connect the projection portions 13d, and extends in the axial direction in the same manner as the case of the projection portion 13d. The first coil cover 13 has peripheral walls extending in the axial direction; that is, the inner peripheral wall 13p that constitutes a first peripheral wall, and the outer peripheral wall 13b that constitutes a second peripheral wall.

Furthermore, as illustrated in FIG. 3, a plurality of projection portions 14d are formed on the periphery of an opening 14c in the center of the second coil cover 14, the projection portion 14d extending in the axial direction in the same manner as the case of the outer peripheral wall 14b. Each of the projection portion 14d includes a stepped portion 14e formed in the distal end thereof. In the present embodiment, ten projection portions 14d are formed in the circumferential direction at even pitch intervals, in conformity with the external shape of the flange part 8a. The projection portion 14d has a shape with a width gradually increased toward the ring part 14a side of the second coil cover 14 in the circumferential direction. Furthermore, the second coil cover 14 is provided with an inner peripheral wall 14p that is arranged between the projection portions 14d adjacent to each other so as to connect the projection portions 14d, and extends in the axial direction in the same manner as the case of the projection portion 14d. The second coil cover 14 has peripheral walls extending in the axial direction; that is, the inner peripheral wall 14p that constitutes a first peripheral wall, and the outer peripheral wall 14b that constitutes a second peripheral wall.

To explain the first coil cover 13 also in conjunction with FIG. 2, there is a rib 13j formed in the inner peripheral face of the projection portion 13d. The rib 13j is formed on the ring part 13a in an erected manner. The rib 13j is integrally formed with the projection portion 13d by injection molding, and extends in a substantially perpendicular direction with respect to the inner peripheral face of the projection portion 13d. Furthermore, as illustrated in FIG. 3, there is a rib 14j formed in the inner peripheral face of the projection portion 14d. The rib 14j is formed on the ring part 14a in an erected manner. The rib 14j is integrally formed with the projection portion 14d by injection molding, and extends in a substantially perpendicular direction with respect to the inner peripheral face of the projection portion 14d. The rib 13j reinforces the strength of the projection portion 13d, and the rib 14j reinforces the strength of the projection portion 14d.

The first coil cover 13 and the second coil cover 14 each of which has the above-mentioned structure are attached to the stator core 4 from both sides of the stator core 4 in the axial direction thus constituting the stator structure. In the present embodiment, the first coil cover 13 and the second coil cover 14 cover the stator core 4 from both sides of the stator core 4 in the axial direction while being connected with each other by way of the insulator 6.

To be more specific, the first coil cover 13 is connected with the first insulator 7, and the second coil cover 14 is connected with the second insulator 8. For example, the resin pins 7c formed in the first insulator 7 are inserted into the respective through holes 13f formed in the first coil cover 13, and the first coil cover 13 and the first insulator 7 are connected with each other by way of the resin pins 7c formed in the first insulator 7. Furthermore, for example, the resin pins 8c formed in the second insulator 8 are inserted into the respective through holes 14f formed in the second coil cover 14, and the second coil cover 14 and the second insulator 8 are connected with each other by way of the resin pins 8c formed in the second insulator 8.

Figure 4:
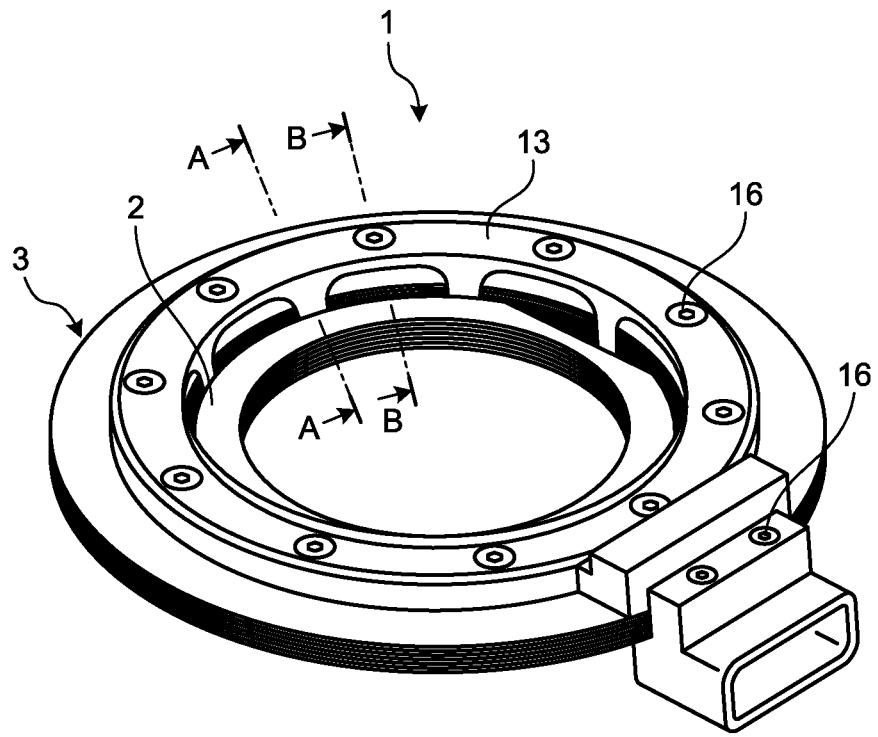
FIG. 4 is a perspective view of the resolver in which the first coil cover and the second coil cover that are illustrated in FIG. 1 are attached to a stator core, as viewed from the upper surface of the resolver.
Figure 5:
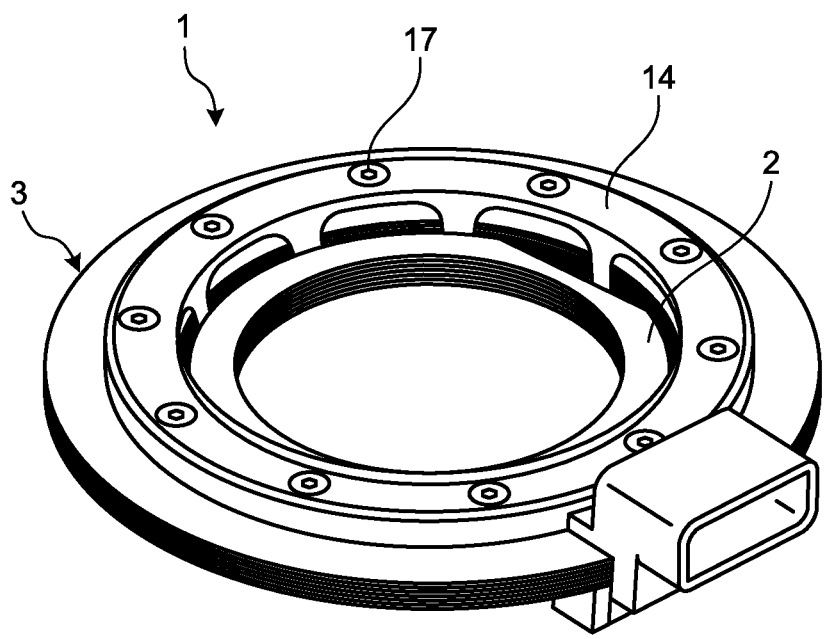
FIG. 5 is a perspective view of the resolver illustrated in FIG. 4 as viewed from the bottom surface of the resolver.
Figure 6:
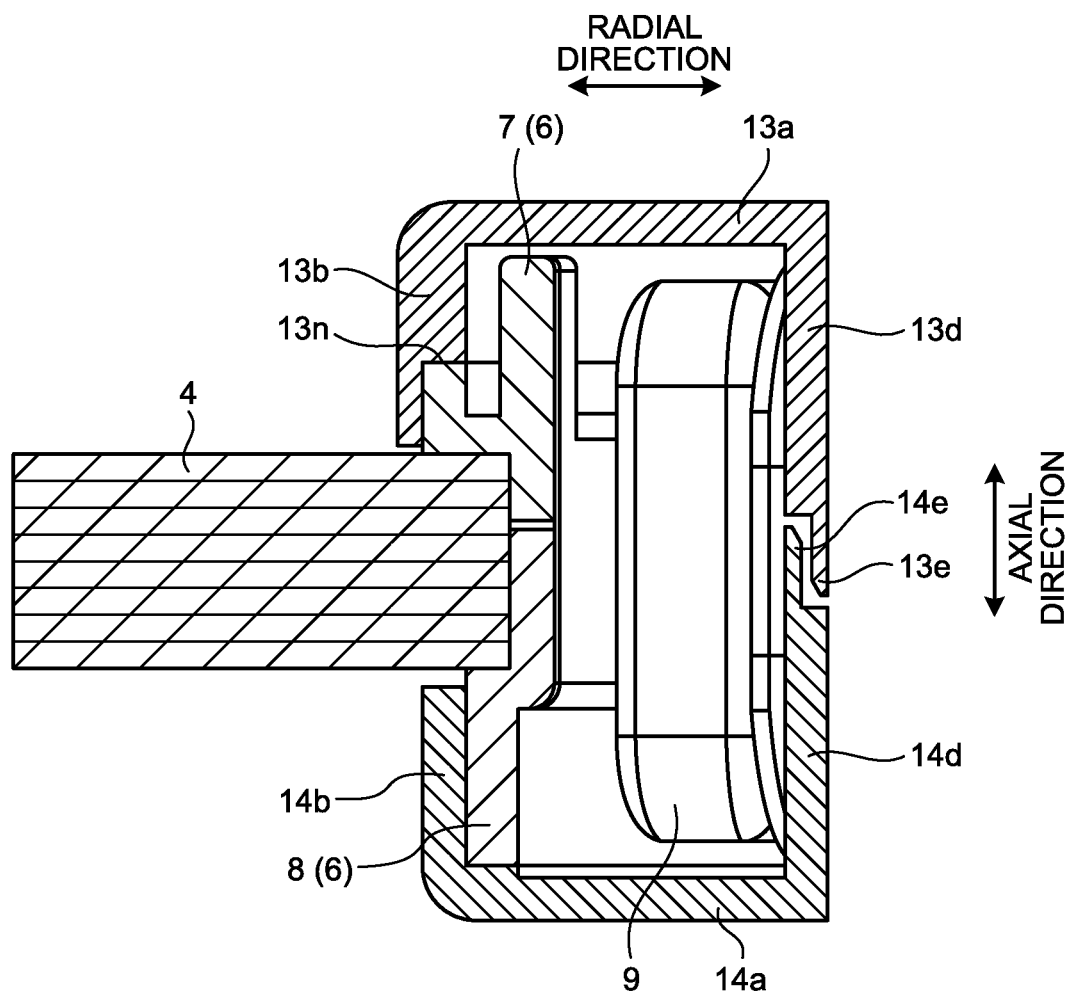
FIG. 6 is a cross-sectional view taken along a line A-A in FIG. 4, illustrating the essential-part of the resolver in a state that a rotor is removed from the resolver.
Figure 7:
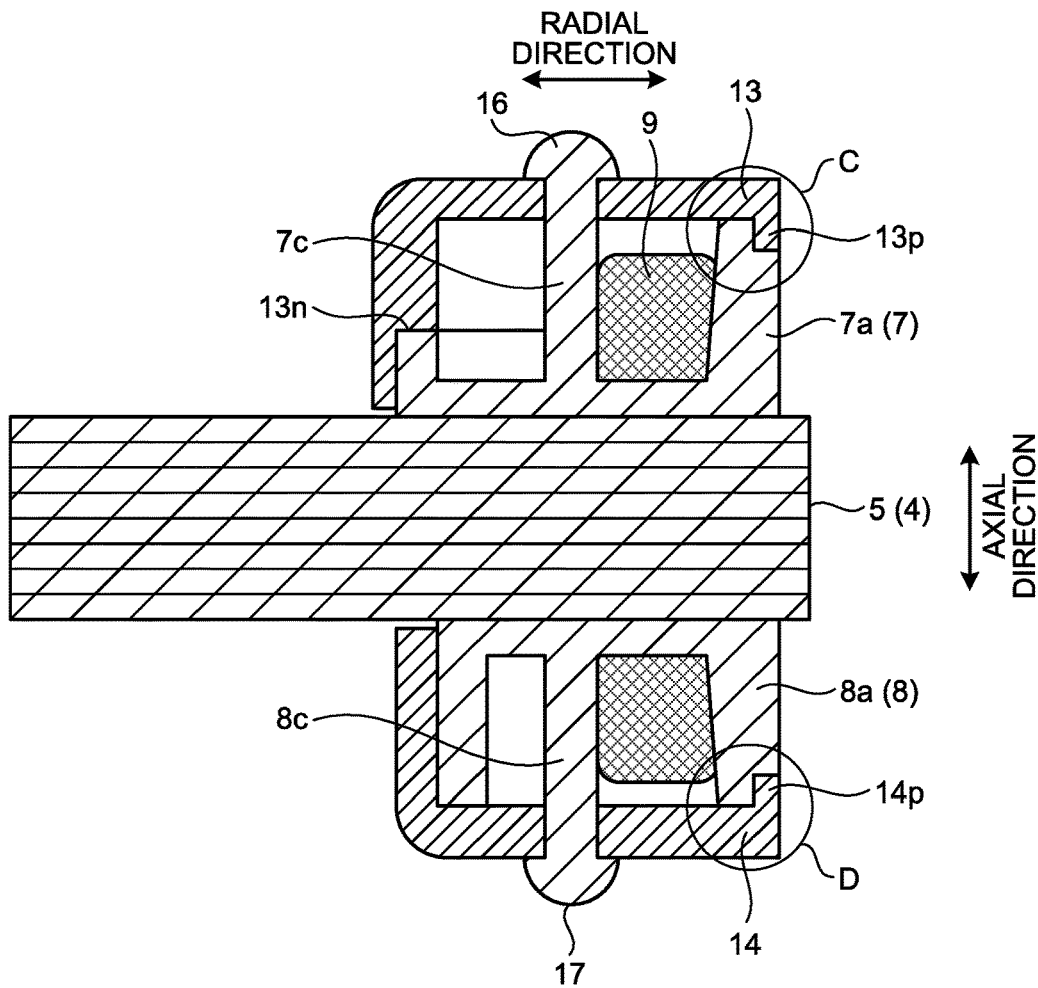
FIG. 7 is a cross-sectional view taken along a line B-B in FIG. 4, illustrating the essential-part of the resolver in a state that the rotor is removed from the resolver.
Figure 8:
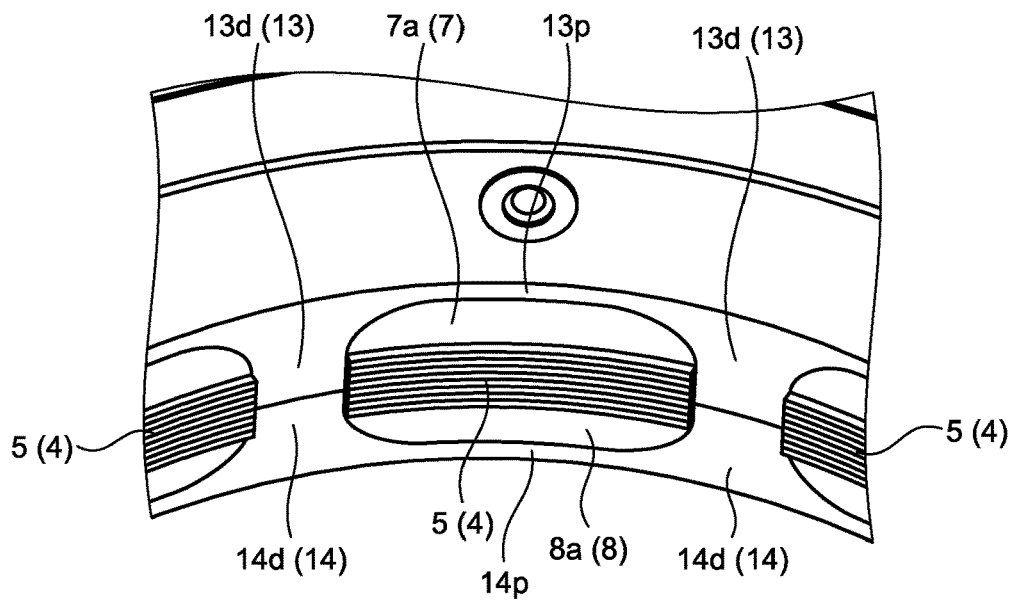
FIG. 8 is a view illustrating a state that the first coil cover and the second coil cover are attached to slots.

FIG. 4 is a perspective view of the resolver 1 in which the first coil cover 13 and the second coil cover 14 that are illustrated in FIG. 1 are attached to the stator 3, as viewed from the upper surface of the resolver 1, and FIG. 5 is a perspective view of the resolver 1 illustrated in FIG. 4 as viewed from the bottom surface of the resolver 1. Furthermore, FIG. 6 is a cross-sectional view taken along a line A-A in FIG. 4, illustrating the essential part of the resolver 1 in a state that the rotor 2 is removed from the resolver 1, and FIG. 7 is a cross-sectional view taken along a line B-B in FIG. 4, illustrating the essential-part of the resolver 1 in a state that the rotor 2 is removed from the resolver 1. FIG. 8 is a view illustrating a state that the first coil cover 13 and the second coil cover 14 are attached to the slots 15.

The resin pins 8c formed in the second insulator 8 are inserted into the respective through holes 14f formed in the second coil cover 14, and a distal end 17 of the resin pin 8c projected from the through hole 14f is crushed by infrared caulking or thermal caulking (see FIG. 5 and FIG. 7). In the present embodiment, ten distal ends 17 are crushed by caulking. The second coil cover 14 is thus connected with the second insulator 8. Furthermore, the resin pins 7c formed in the first insulator 7 are inserted into the respective through holes 13f formed in the first coil cover 13, and a distal end 16 of the resin pin 7c projected from the through hole 13f is crushed by infrared caulking or thermal caulking (see FIG. 4 and FIG. 7). In the present embodiment, twelve distal ends 16 are crushed by caulking. The first coil cover 13 is thus connected with the first insulator 7.

The first coil cover 13 and the first insulator 7 are connected with each other through the resin pins 7c, and the second coil cover 14 and the second insulator 8 are connected with each other through the resin pins 8c, making it possible to acquire a sufficient connection strength. Furthermore, the resin pin 7c (distal end 16) is fixed by caulking on the surface of the first coil cover 13, and the resin pin 8c (distal end 17) is fixed by caulking on the surface of the second coil cover 14, making it possible to easily perform a visual check of the appearance state of caulking. Consequently, it is possible to further improve the reliability of the stator structure and the resolver 1.

Furthermore, as illustrated in FIG. 8, the projection portion 13d of the first coil cover 13 and the projection portions 14d of the second coil cover 14 are arranged in the respective spaces (slots 15) between the distal ends of the teeth 5. The projection portions 13d and the projection portions 14d are inserted into the respective spaces (slots 15) between the distal ends of the teeth 5. Here, as explained in conjunction with FIG. 2 and FIG. 3, the stepped portion 13e is formed on the distal end of each of the projection portions 13d, and the stepped portion 14e is formed on the distal end of each of the projection portions 14d.

Furthermore, as illustrated in FIG. 6, the stepped portion 13e and the stepped portion 14e are formed so that the stepped portion 13e and the stepped portion 14e face each other in an opposed manner. Due to such constitution, the stepped portion 13e and the stepped portion 14e are arranged in a mutually nested manner, and a part of the stepped portion 13e and a part of the stepped portion 14e are overlapped with each other in a spaced-apart manner with a slight distance (0.02 mm to 1 mm, for example), in the radial direction. Accordingly, the portion in which the stepped portion 13e and the stepped portion 14e are overlapped with each other has a structure such that the slot 15 is directly invisible from the inner periphery side of the stator core 4. Even when the projection portion 13d and the projection portion 14d are spaced apart from each other with a slight distance, such an arrangement constitution of the stepped portion 13e and the stepped portion 14e forms a crooked space and hence, it is difficult for foreign materials to pass through the stepped portion 13e and the stepped portion 14e, making it possible to prevent or suppress the foreign materials from entering into the inside of the slot 15.

In a portion where the insulator 6 and the first coil cover 13 are brought into contact with each other on the outer periphery side thereof; that is, in a portion where the first insulator 7 and the outer peripheral wall 13b are brought into contact with each other, as illustrated in FIG. 6 and FIG. 7, a step 13n in which the first insulator 7 and the outer peripheral wall 13b face each other in an opposed manner is formed. The outer periphery of the first insulator 7 is arranged to face the first coil cover 13 in a stepped manner at the place of the step 13n and hence, it is difficult for foreign materials to pass through the step 13n, making it possible to prevent or suppress the foreign materials from entering into the inside of the first coil cover 13.

Figure 9:
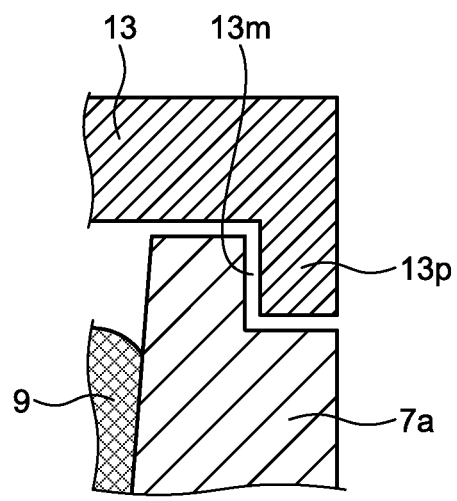
FIG. 9 is an enlarged view of an area C illustrated in FIG. 7.
Figure 10:
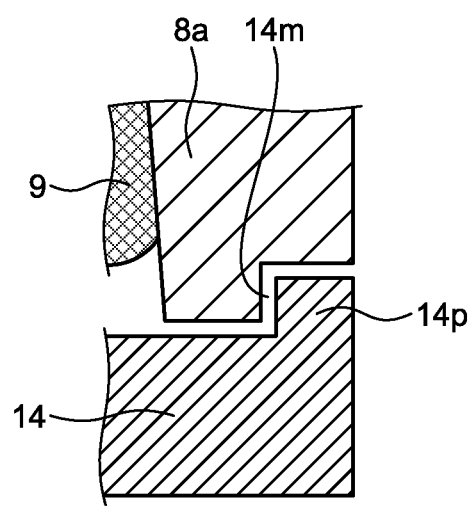
FIG. 10 is an enlarged view of an area D illustrated in FIG. 7.

In a portion where the insulator 6 abuts on the inner periphery side of the first coil cover 13; that is, in a portion where the flange part 7a abuts on the first coil cover 13 (inner peripheral wall 13p), as illustrated in FIG. 9 that is an enlarged view of an area C in FIG. 7, a step in which the flange part 7a and the first coil cover 13 face each other in an opposed manner by way of a space is formed. In addition, in a portion where the insulator 6 abuts on the inner periphery side of the second coil cover 14; that is, in a portion where the flange part 8a abuts on the second coil cover 14 (inner peripheral wall 14p), as illustrated in FIG. 10 that is an enlarged view of an area D in FIG. 7, a step in which the flange part 8a and the second coil cover 14 face each other in an opposed manner by way of a space is formed. Due to such constitution, the flange part 7a and the first coil cover 13 (the flange part 8a and the second coil cover 14) face each other in a slightly spaced-apart manner. Furthermore, the slot 15 has a structure such that the slot 15 is closed by the projection portion 13d and the projection portion 14d. As a result, in the peripheries of the flange part 7a and the flange part 8a in the insulator 6, the crooked space formed between the first coil cover 13 and the flange part 7a, and the crooked space formed between the second coil cover 14 and the flange part 8a make foreign materials difficult to pass therethrough, making it possible to prevent or suppress the entering of the foreign-materials into the inside of the coil cover without causing the flange parts 7a, 8a and inner peripheral walls 13p, 14p to be deformed.

Here, the explanation is made in detail with respect to the space formed by the flange part 7a and the first coil cover 13 (inner peripheral wall 13p), and the space formed by the flange part 8a and the second coil cover 14 (inner peripheral wall 14p) in conjunction with FIG. 9 and FIG. 10, respectively. FIG. 9 is an enlarged view of the area C illustrated in FIG. 7, and FIG. 10 is an enlarged view of the area D illustrated in FIG. 7.

As illustrated in FIG. 9, the flange part 7a located at the distal end of the arm of the first insulator 7, and the inner peripheral wall 13p of the first coil cover 13 are arranged to face each other in a slightly spaced-apart manner with a space 13m therebetween. To be more specific, a stepped portion is formed in the flange part 7a of the first insulator 7, and the inner peripheral wall 13p of the first coil cover 13 is arranged to face the stepped portion. In this case, the inner peripheral wall 13p and the flange part 7a are arranged to face each other in a slightly spaced-apart manner with the space 13m in the axial direction and in the radial direction. For example, the space 13m is assumed to be in the range of 0.01 mm to 0.5 mm in the axial direction, and in the range of 0.02 mm to 0.5 mm in the radial direction. In this manner, the small space 13m is formed between the flange part 7a of the first insulator 7 and the first coil cover 13 in a crooked manner, making it possible to prevent or suppress the entering of foreign materials into the stator 3.

In the same manner as above, as illustrated in FIG. 10, the flange part 8a located at the distal end of the arm of the second insulator 8, and the inner peripheral wall 14p of the second coil cover 14 are arranged to face each other in a slightly spaced-apart manner with a space 14m therebetween. To be more specific, a stepped portion is formed in the flange part 8a of the second insulator 8, and the inner peripheral wall 14p of the second coil cover 14 is arranged to face the stepped portion. In this case, the inner peripheral wall 14p and the flange part 8a are arranged to face each other in a slightly spaced-apart manner with the space 14m in the axial direction and in the radial direction. For example, the space 14m is assumed to be in the range of 0.01 mm to 0.5 mm in the axial direction, and in the range of 0.02 mm to 0.5 mm in the radial direction. In this manner, the small space 14m is formed between the flange part 8a of the second insulator 8 and the second coil cover 14 in a crooked manner, making it possible to prevent or suppress the entering of foreign materials into the stator 3.

As mentioned above, in the constitution according to the present embodiment, the inner peripheral wall 13p that constitutes the first peripheral wall of the first coil cover 13, and the flange part 7a located on one side of the insulator 6 in the axial direction are arranged to face each other in a spaced-apart manner with the space 13m, and the inner peripheral wall 14p that constitutes the first peripheral wall of the second coil cover 14, and the flange part 8a located on the other side of the insulator 6 in the axial direction are arranged to face each other in a spaced-apart manner with the space 14m. Furthermore, in the constitution according to the present embodiment, the inner peripheral wall 13p that constitutes the first peripheral wall of the first coil cover 13 is arranged to face the stepped portion formed in the flange part 7a located on one side of the insulator 6 in the axial direction so as to form the space 13m crooked between the inner peripheral wall 13p and the stepped portion, and the inner peripheral wall 14p that constitutes the first peripheral wall of the second coil cover 14 is arranged to face the stepped portion formed in the flange part 8a located on the other side of the insulator 6 in the axial direction so as to form the space 14m crooked between the inner peripheral wall 14p and the stepped portion. In the constitution according to the present embodiment mentioned above, the flange part 7a of the first insulator 7 and the first coil cover 13 are arranged to face each other in a slightly spaced-apart manner with the space 13m, the flange part 8a of the second insulator 8 and the second coil cover 14 are arranged to face each other in a slightly spaced-apart manner with the space 14m, and each of the space 13m and the space 14m is formed in a crooked manner, making it possible to prevent or suppress the entering of foreign materials into the stator 3 without causing, for example, the flange part 7a, the inner peripheral wall 13p, the flange part 8a, and the inner peripheral wall 14p to be deformed. As a result, in the constitution according to the present embodiment, it is possible to further improve the reliability of the stator structure and the resolver 1.

Second Embodiment

In a second embodiment, the explanation is made with respect to the case where a constitution such that a flange part of an insulator and a coil cover are arranged to face each other with a slight space therebetween is applied to a resolver different in constitution from the resolver 1 according to the first embodiment.

Figure 11:
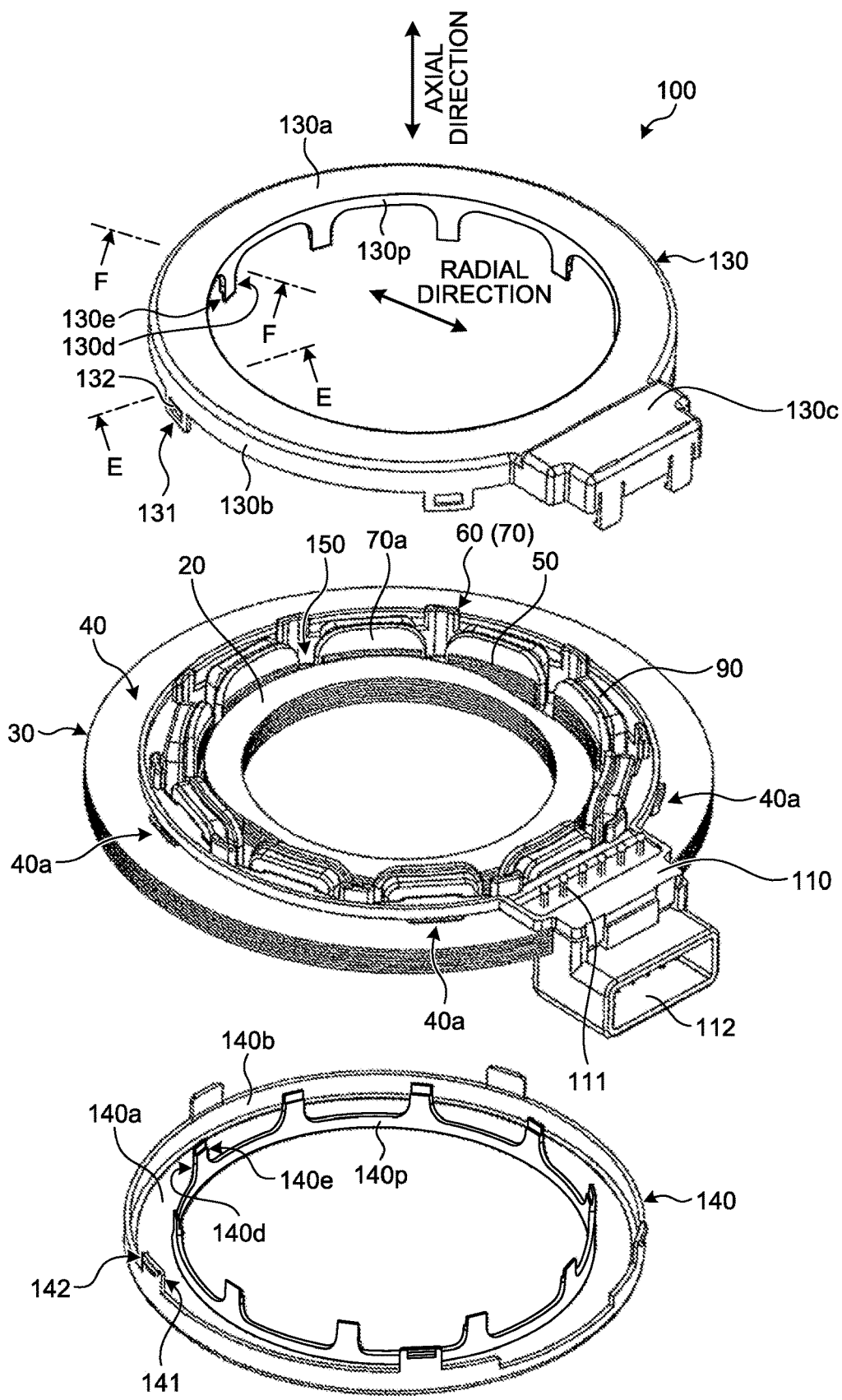
FIG. 11 is a schematic exploded perspective view of a resolver according to a second embodiment.

FIG. 11 is a schematic exploded perspective view of a resolver according to the second embodiment. Furthermore, FIG. 12 is a cross-sectional view of the resolver, being taken along a line E-E in FIG. 11, and FIG. 13 is a cross-sectional view of the resolver, being taken along a line F-F in FIG. 11.

Figure 12:
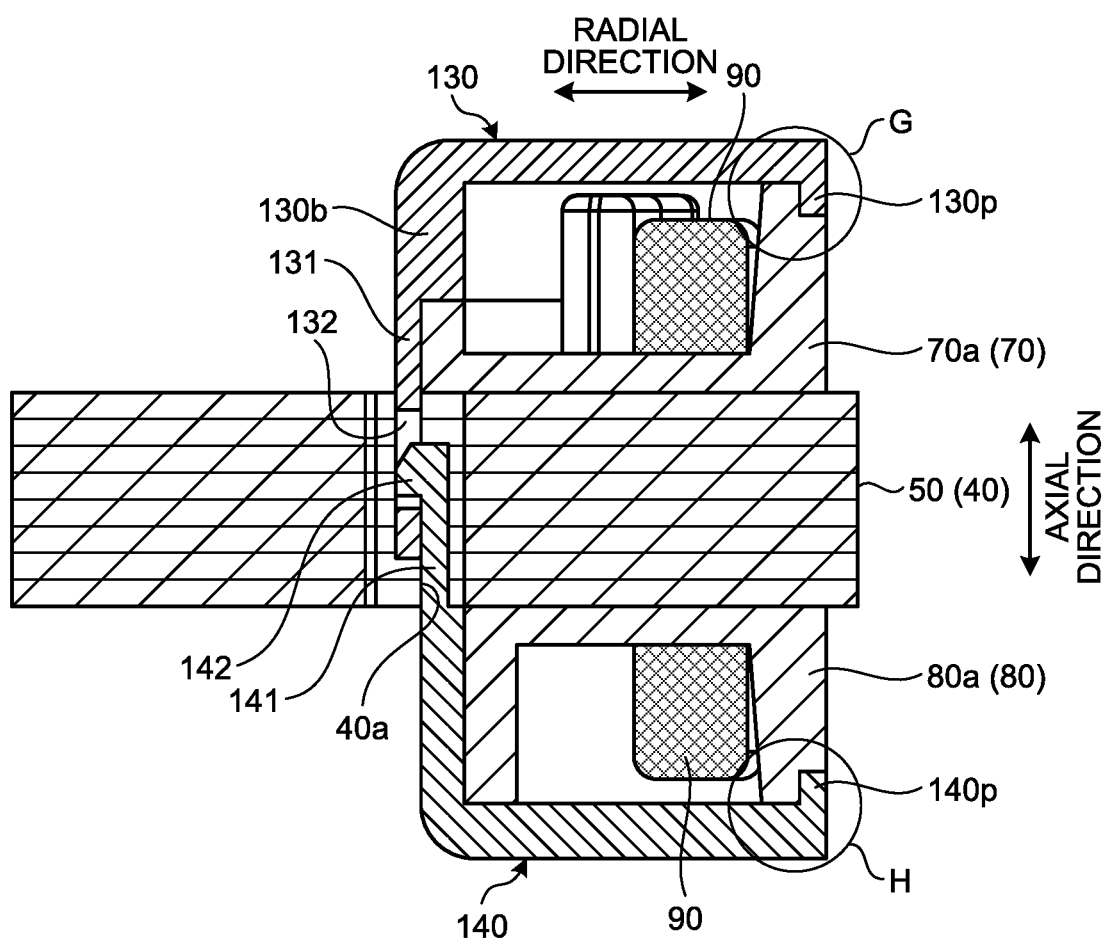
FIG. 12 is a cross-sectional view of the resolver, the cross-sectional view being taken along a line E-E in FIG. 11.
Figure 13:
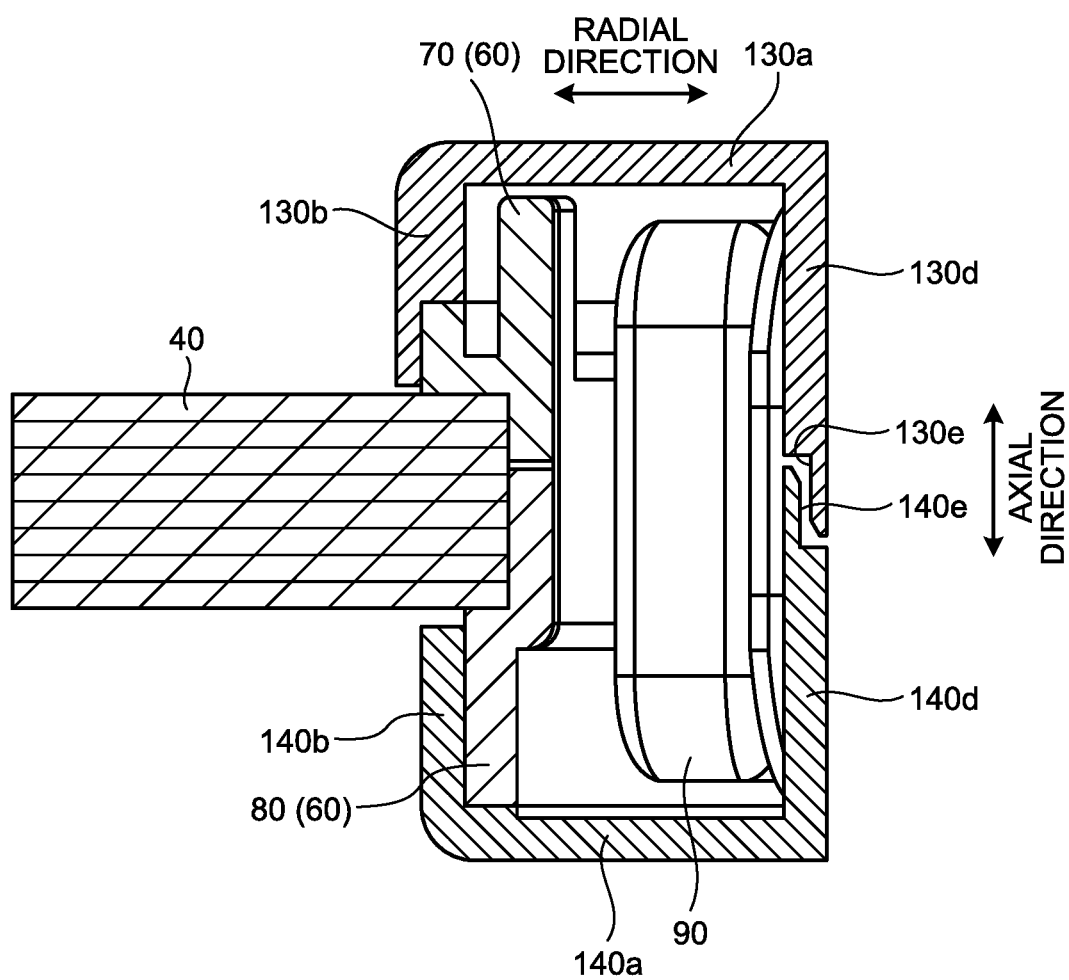
FIG. 13 is a cross-sectional view of the resolver, the cross-sectional view being taken along a line F-F in FIG. 11.

As illustrated in FIGS. 11 to 13, a resolver 100 according to the second embodiment is a variable reluctance (VR) type resolver having a rotor 20, a stator 30, a first coil cover 130, and a second coil cover 140. The stator 30, the first coil cover 130, and the second coil cover 140 constitute a stator structure.

The rotor 20 has a laminated structure in which a plurality of steel-sheet cores each of which is composed of a soft magnetic material, such as a silicon steel sheet, are laminated, the rotor 20 being attached to a rotational shaft of a motor (not illustrated in the drawings) and arranged in the inside of the stator 30. An axial direction illustrated in FIG. 11 coincides with the axial direction of the rotational shaft of the motor connected with the rotor 20. Furthermore, as illustrated in FIG. 11, a radial direction coincides with the direction orthogonal to the axial direction. Here, the radial direction indicates any directions parallel to the surface orthogonal to the axial direction. In FIG. 11, one of radial directions is indicated by a double-headed arrow.

The stator 30 has a stator core 40, a coil 90, and an insulator 60. The stator core 40 is constituted of a predetermined number of steel-sheet cores each of which is composed of a soft magnetic material, such as a silicon steel sheet, the steel-sheet cores being laminated to each other in the axial direction. The stator core 40 has a plurality of teeth 50 that extend in the radial direction from an annular part that is an annular body part. In the present embodiment, the resolver 100 is an inner rotor type resolver, and the stator core 40 has the teeth 50 that inward extend in the radial direction from the annular part that is the annular body part. In the present embodiment, although the stator core 40 has ten teeth 50, the number of the teeth is not particularly limited. The teeth 50 are arranged at equal angle intervals in a circumferential direction of the annular part, and each of the teeth 50 has a distal end portion that extends in the circumferential direction. There is a space (slot 150) formed between every two teeth 50.

Furthermore, in the annular part of the stator core 40, a plurality of through holes 40a are formed so as to penetrate through two principal surfaces of the annular part of the stator core 40. The through hole 40a is formed at a position closer to the outer periphery side of the stator core 40 than the surface of the annular part covered with the insulator 60 described below. In the present embodiment, although five through holes 40a are formed, the number of the through holes 40a is not particularly limited. In the present embodiment, the through holes 40a are arranged at equal angle intervals in the circumferential direction of the annular part.

The coil 90 is a winding wound around each of the teeth 50 with the insulator 60 interposed therebetween. The coil 90 is constituted of an excitation winding that inputs an excitation signal therein, and a detection winding that outputs two-phase signals depending on the rotational angle of the rotor 20, the detection winding being constituted of a sin-θ detection winding from which a sine-phase signal dependent on sin θ is output, and a cos-θ detection winding from which a cosine-phase signal dependent on cos θ is output.

The insulator 60 is formed by injection molding with the use of an insulation resin material. The insulator 60 is constituted of a first insulator 70 and a second insulator 80 that cover the teeth 50 from both sides of the stator core 40 in the axial direction. Furthermore, the insulator 60 has flange parts (flange part 70a and flange part 80a) that cover respective distal ends of the teeth 50 from both sides of the stator core 4 in the axial direction. Here, in FIG. 11, as for the insulator 60, the first insulator 70 attached to the teeth 50 from above is illustrated, and the second insulator 80 attached to the teeth 50 from below is not illustrated.

The insulator 60 is provided with a terminal block part 110 that extends in the radial direction of the stator core 40. In the present embodiment, the first insulator 70 is provided with the terminal block part 110 that extends outward in the radial direction of the stator core 40. The terminal block part 110 includes a plurality of terminals 111 (six terminals 111 in FIG. 11) implanted thereinto, and a female connector housing 112 formed therein. The terminal block part 110 can be formed simultaneously with the first insulator 70. One end of each terminal 111 twines therearound an end of a winding that constitutes the corresponding coil 90, and the other end of each terminal 111 is projected into the inside of the connector housing 112. The other end of each terminal 111 is connected with an external connector. The first insulator 70 and the terminal block part 110 are integrally performed with each other by injection molding with the use of an insulation resin material.

The first insulator 70 is provided with a plurality of arms (ten arms in FIG. 11) each of which extends inward from an annular part in the radial direction. The flange part 70a is provided to the distal end of each of the arms. The arm of the first insulator 70 is attached to a part (upper side) of each of the teeth 50 of the stator core 40. The flange part 70a covers the upper side of the distal end portion of each of the teeth 50 to prevent the winding (coil 90) wound around the arm from winding deformation. Furthermore, the second insulator 80 is provided with a plurality of arms (ten arms in the present embodiment) each of which extends inward from an annular part in the radial direction in the same manner as the case of the first insulator 70. The flange part 80a is provided to the distal end of each of the arms. The arm of the second insulator 80 is attached to a part (lower side) of each of the teeth 50 of the stator core 40. The flange part 80a covers the lower side of the distal end portion of each of the teeth 50 to prevent the winding (coil 90) wound around the arm from winding deformation.

Here, in one example mentioned above, although the insulator 60 is constituted of the first insulator 70 and the second insulator 80, the insulator 60 may be integrally formed with the stator core 40 by insert molding. That is, the first insulator 70 and the second insulator 80 may be integrally formed with each other so as to constitute the insulator 60. Furthermore, in one example mentioned above, although the first insulator 70 and the terminal block part 110 are integrally formed with each other by injection molding, a constitution in which the terminal block part 110 formed as a separate member is attached to the first insulator 70 may be adopted. In addition, the present embodiment may adopt a constitution in which the connector housing 112 is not formed.

Next, the first coil cover 130 and the second coil cover 140 are explained. Although the constituent material of each of the first coil cover 130 and the second coil cover 140 is not limited, each of the first coil cover 130 and the second coil cover 140 in the present embodiment is composed of a resin material and, for example, formed by injection molding with the use of a resin material. As the resin material, an insulation resin material or the like can be used. The first coil cover 130 and the second coil cover 140 cover the coil 90 from both sides of the stator core 40 in the axial direction to protect the coil 90. As illustrated in FIG. 11, the first coil cover 130 is attached to the stator core 40 from the upper side of the coil 90, and the second coil cover 140 is attached to the stator core 40 from the lower side of the coil 90.

As illustrated in FIG. 11, the first coil cover 130 having a ring part 130a that constitutes the body of the first coil cover 130 is formed in an annular shape as a whole, and the ring part 130a is provided with an outer peripheral wall 130b that is arranged on the outer periphery of the ring part 130a, and extends in the axial direction. In a part of the outer peripheral wall 130b, a terminal block cover part 130c that covers the terminal block part 110 mentioned above is formed. The terminal block cover part 130c that covers the terminal block part 110 has a plurality of separation members (partition plate) formed in the inside of the terminal block cover part 130c, and the respective terminals 111 are housed in a plurality of spaces formed by the separation members in a spaced-apart manner from each other. The constitution such that the terminal 111 is housed in the space formed in the inside of the terminal block cover part 130c is capable of preventing an electrical short circuit between the terminals 111 due to foreign materials entered into the inside of the stator structure. Furthermore, as illustrated in FIG. 11, the second coil cover 140 having a ring part 140a that constitutes the body of the second coil cover 140 is formed in an annular shape as a whole, and the ring part 140a is provided with an outer peripheral wall 140b that is arranged on the outer periphery of the ring part 140a, and extends in the axial direction. The inside diameter and the outside diameter of the ring part 140a of the second coil cover 140 are approximately the same as the inside diameter and the outside diameter of the ring part 130a of the first coil cover 130, respectively.

Furthermore, the first coil cover 130 is provided with a plurality of first engagement portions 131 (five first engagement portions 131 in the present embodiment) each of which extends from the outer peripheral wall 130b in the axial direction. The first engagement portion 131 is formed in a plate-like shape, and includes an opening 132 formed in the distal end thereof. In the present embodiment, the first engagement portions 131 are arranged at equal angle intervals in the circumferential direction of the first coil cover 130. Furthermore, the first coil cover 130 is provided with a plurality of projection portions 130d (ten projection portions 130d in the embodiment) each of which extends from the inner periphery edge of the ring part 130a in the axial direction in the same manner as the case of the first engagement portion 131. Each of the projection portions 130d includes a stepped portion 130e formed in the distal end thereof. In the present embodiment, the projection portions 130d are arranged at equal angle intervals in the circumferential direction of the first coil cover 130, in conformity with the external shape of the flange part 70a. The projection portion 130d has a shape with a width gradually increased toward the ring part 130a side of the first coil cover 130 in the circumferential direction. Furthermore, the first coil cover 130 is provided with an inner peripheral wall 130p that is arranged between the projection portions 130d adjacent to each other so as to connect the projection portions 130d, and extends in the axial direction in the same manner as the case of the projection portion 130d. The first coil cover 130 has peripheral walls each of which extends in the axial direction; that is, the inner peripheral wall 130p that constitutes a first peripheral wall, and the outer peripheral wall 130b that constitutes a second peripheral wall.

Furthermore, the second coil cover 140 is provided with a plurality of second engagement portions 141 (five second engagement portions 141 in the present embodiment) each of which extends from the outer peripheral wall 140b in the axial direction. The second engagement portion 141 is formed in a plate-like shape, and includes an engagement claw 142 formed in the distal end thereof. In the present embodiment, the second engagement portions 141 are arranged at equal angle intervals in the circumferential direction of the second coil cover 140. Furthermore, the second coil cover 140 is provided with a plurality of projection portions 140d (ten projection portions 140d in the embodiment) each of which extends from the inner periphery edge of the ring part 140a in the axial direction in the same manner as the case of the second engagement portion 141. Each of the projection portions 140d includes a stepped portion 140e formed in the distal end thereof. In the present embodiment, the projection portions 140d are arranged at equal angle intervals in the circumferential direction of the second coil cover 140. Furthermore, the projection portion 140d has a shape with a width gradually increased toward the ring part 140a side of the second coil cover 140 in the circumferential direction, in conformity with the external shape of the flange part 80a. In addition, the second coil cover 140 is provided with an inner peripheral wall 140p that is arranged between the projection portions 140d adjacent to each other so as to connect the projection portions 140d, and extends in the axial direction in the same manner as the case of the projection portion 140d. The second coil cover 140 has peripheral walls each of which extends in the axial direction; that is, the inner peripheral wall 140p that constitutes a first peripheral wall, and the outer peripheral wall 140b that constitutes a second peripheral wall.

When the first coil cover 130 and the second coil cover 140 are attached to the stator 30, the first coil cover 130 and the second coil cover 140 are brought closer to the stator 30 from both sides of the stator 30 in the axial direction, each of the projection portions 130d of the first coil cover 130 is inserted between the flange parts 70a each of which covers the distal end portion of each of the teeth 50 from above, and each of the projection portions 140d of the second coil cover 140 is inserted between the flange parts 80a each of which covers the distal end portion of each of the teeth 50 from below (see FIG. 13). At the same time, each of the first engagement portions 131 of the first coil cover 130, and each of the second engagement portions 141 of the second coil cover 140 are inserted into the respective through holes 40a formed in the annular part of the stator core 40, and the engagement claw 142 of the second engagement portion 141 is engaged with the opening 132 of the first engagement portion 131 by way of the through hole 40a (see FIG. 12).

Due to such constitution, the first coil cover 130 and the second coil cover 140 are engaged with each other by way of the first engagement portions 131 and the second engagement portions 141. Furthermore, the projection portion 130d is arranged between the flange parts 70a adjacent to each other, and the projection portion 140d is arranged between the flange parts 80a adjacent to each other. Consequently, each of the slots 150 is closed by the projection portion 130d and the projection portion 140d that face each other in an opposed manner, with respect to the inside of the stator core 40.

The first coil cover 130 and the second coil cover 140 can be easily attached to the stator 30 by the engagement of the engagement claw 142 with the opening 132. Furthermore, as illustrated in FIG. 12 also, in the present embodiment, the first engagement portion 131 and the second engagement portion 141 are engaged with each other in the inside of the through hole 40a and hence, it is possible to make the first coil cover 130 and the second coil cover 140 difficult to detach from the stator 30 after the first coil cover 130 and the second coil cover 140 are attached to the stator 30.

The first coil cover 130 and the second coil cover 140 are attached to the stator 30 thus covering the coil 90 and the terminal block part 110 therewith. Due to such constitution, the coil 90, the winding that constitutes the coil 90, and the terminal block part 110 are not exposed thus preventing the damage of the coil 90, the winding that constitutes the coil 90, and the terminal 111.

Here, as mentioned above, the stepped portion 130e is formed in the distal end of each of the projection portions 130d, and the stepped portion 140e is formed in the distal end of each of the projection portions 140d. Furthermore, as illustrated in FIG. 13, the stepped portion 130e and the stepped portion 140e are configured to face each other in an opposed manner. Due to such constitution, the stepped portion 130e and the stepped portion 140e are arranged in a mutually nested manner, and a part of the stepped portion 130e and a part of the stepped portion 140e are overlapped with each other in a spaced-apart manner with a slight distance (0.02 mm to 1 mm, for example), in the radial direction. Accordingly, the portion in which the stepped portion 130e and the stepped portion 140e are overlapped with each other has a structure such that the slot 150 is directly invisible from the inner periphery side of the stator core 40. Even when the projection portion 130d and the projection portion 140d are spaced apart from each other with a slight distance, such an arrangement constitution of the stepped portion 130e and the stepped portion 140e forms a crooked space thus making foreign materials difficult to pass through the crooked space. As a result, it is possible to prevent or suppress the foreign materials from entering into the inside of the slot 150.

Here, in the second embodiment, a rib may be formed on each of the inner peripheral face of the projection portion 130d and the inner peripheral face of the projection portion 140d in order to reinforce the strengths of the projection portion 130d and the projection portion 140d in the same manner as the projection portion 13d and the projection portion 14d that are explained in the first embodiment.

Figure 14:
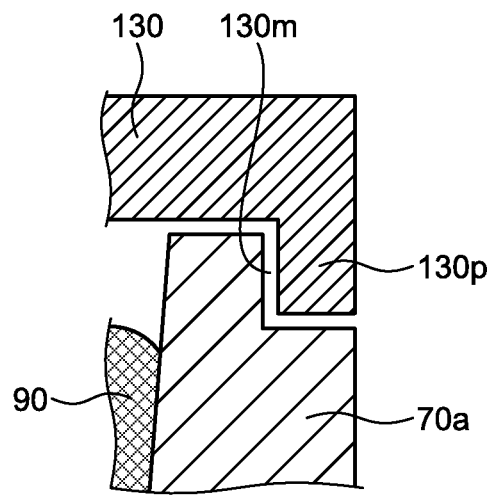
FIG. 14 is an enlarged view of an area G illustrated in FIG. 12.
Figure 15:
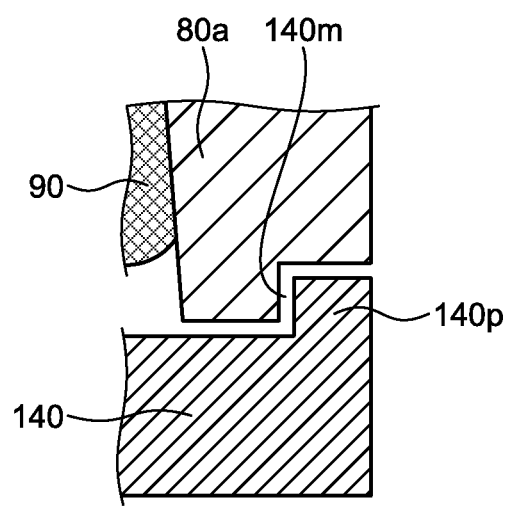
FIG. 15 is an enlarged view of an area H illustrated in FIG. 12.

Furthermore, in a portion where the insulator 60 abuts on the inner periphery side of the first coil cover 130; that is, in a portion where the flange part 70a abuts on the first coil cover 130 (inner peripheral wall 130p), as illustrated in FIG. 14 that is an enlarged view of an area G in FIG. 12, steps facing each other in an opposed manner by way of a space are formed. In addition, in a portion where the insulator 60 abuts on the inner periphery side of the second coil cover 140; that is, in a portion where the flange part 80a abuts on the second coil cover 140 (inner peripheral wall 140p), as illustrated in FIG. 15 that is an enlarged view of an area H in FIG. 12, steps facing each other in an opposed manner are formed. Due to such constitution, the flange part 70a and the first coil cover 130 (the flange part 80a and the second coil cover 140) face each other in a slightly spaced-apart manner. Furthermore, the slot 150 has a structure such that the slot 150 is closed by the projection portion 130d and the projection portion 140d. As a result, in the periphery of the flange part 70a and the flange part 80a in the insulator 60, the crooked space formed between the first coil cover 130 and the flange part 70a, and the crooked space formed between the second coil cover 140 and the flange part 80a make foreign materials difficult to pass therethrough, making it possible to prevent or suppress the foreign-materials from entering into the inside of the coil cover.

Here, the explanation is made in detail with respect to the space formed by the flange part 70a and the first coil cover 130 (inner peripheral wall 130p), and the space formed by the flange part 80a and the second coil cover 140 (inner peripheral wall 140p) in conjunction with FIG. 14 and FIG. 15, respectively. FIG. 14 is the enlarged view of the area G illustrated in FIG. 12, and FIG. 15 is the enlarged view of the area H illustrated in FIG. 12.

As illustrated in FIG. 14, the flange part 70a located at the distal end of the arm of the first insulator 70, and the inner peripheral wall 130p of the first coil cover 130 are arranged to face each other in a slightly spaced-apart manner with a space 130m therebetween. To be more specific, a stepped portion is formed in the flange part 70a of the first insulator 70, and the inner peripheral wall 130p of the first coil cover 130 is arranged to face the stepped portion. In this case, the inner peripheral wall 130p and the flange part 70a are arranged to face each other in a slightly spaced-apart manner with the space 130m in the axial direction and in the radial direction. For example, the space 130m is assumed to be in the range of 0.01 mm to 0.5 mm in the axial direction, and in the range of 0.02 mm to 0.5 mm in the radial direction. In this manner, the small space 130m is formed between the flange part 70a of the first insulator 70 and the first coil cover 130 in a crooked manner, making it possible to prevent or suppress the entering of foreign materials into the stator 30.

In the same manner as above, as illustrated in FIG. 15, the flange part 80a located at the distal end of the arm of the second insulators 80, and the inner peripheral wall 140p of the second coil cover 140 are arranged to face each other in a slightly spaced-apart manner with a space 140m therebetween. To be more specific, a stepped portion is formed in the flange part 80a of the second insulators 80, and the inner peripheral wall 140p of the second coil cover 140 is arranged to face the stepped portion. In this case, the inner peripheral wall 140p and the flange part 80a are arranged to face each other in a slightly spaced-apart manner with the space 140m in the axial direction and in the radial direction. For example, the space 140m is assumed to be in the range of 0.01 mm to 0.5 mm in the axial direction, and in the range of 0.02 mm to 0.5 mm in the radial direction. In this manner, the small space 140m is formed between the flange part 80a of the second insulators 80 and the second coil cover 140 in a crooked manner, making it possible to prevent or suppress the entering of foreign materials into the stator 30.

As mentioned above, in the constitution according to the second embodiment, the inner peripheral wall 130p that constitutes the first peripheral wall of the first coil cover 130, and the flange part 70a arranged on one side of the insulator 60 in the axial direction are arranged to face each other in a spaced-apart manner with the space 130m; and the inner peripheral wall 140p that constitutes the first peripheral wall of the second coil cover 140, and the flange part 80a arranged on the other side of the insulator 60 in the axial direction are arranged to face each other in a spaced-apart manner with the space 140m. Furthermore, in the constitution according to the present embodiment, the inner peripheral wall 130p that constitutes the first peripheral wall of the first coil cover 130 is arranged to face the stepped portion formed in the flange part 70a arranged on one side of the insulator 60 in the axial direction so as to form the space 130m crooked between the inner peripheral wall 130p and the stepped portion, and the inner peripheral wall 140p that constitutes the first peripheral wall of the second coil cover 140 is arranged to face the stepped portion formed in the flange part 80a arranged on the other side of the insulator 60 in the axial direction so as to form the space 140m crooked between the inner peripheral wall 140p and the stepped portion. In the constitution according to the present embodiment mentioned above, in the same manner as the case of the first embodiment, the flange part 70a of the first insulator 70 and the first coil cover 130 are arranged to face each other in a slightly spaced-apart manner with the space 130m, the flange part 80a of the second insulator 80 and the second coil cover 140 are arranged to face each other in a slightly spaced-apart manner with the space 140m, and each of the space 130m and the space 140m is formed in a crooked manner, making it possible to prevent or suppress the entering of foreign materials into the stator 30 without causing, for example, the flange part 70a, the inner peripheral wall 130p, the flange part 80a, and the inner peripheral wall 140p to be deformed. As a result, in the constitution according to the present embodiment, it is possible to further improve the reliability of the stator structure and the resolver 100.

Here, in the description above, although the explanation is made with respect to the case that each of the resolver 1 and the resolver 100 is an inner rotor type resolver, the above-mentioned embodiments are also applicable to an outer rotor type resolver such that teeth extend from an annular part to the outside in the radial direction, and a stator core is arranged in the inside of a rotor. When the above-mentioned constitution is applied to the outer rotor type resolver, the outer peripheral wall that constitutes the first peripheral wall of the first coil cover, and the flange part located on one side of the insulator in the axial direction are arranged to face each other with a space therebetween; and the outer peripheral wall that constitutes the first peripheral wall of the second coil cover, and the flange part located on the other side of the insulator in the axial direction are arranged to face each other with a space therebetween. Furthermore, the outer peripheral wall that constitutes the first peripheral wall of the first coil cover is arranged to face the stepped portion formed in the flange part located on one side of the insulator in the axial direction so as to form the space crooked between the outer peripheral wall and the stepped portion, and the outer peripheral wall that constitutes the first peripheral wall of the second coil cover is arranged to face the stepped portion formed in the flange part located on the other side of the insulator in the axial direction so as to form the space crooked between the outer peripheral wall and the stepped portion. Due to such constitution, it is possible to prevent or suppress the entering of foreign materials into the inside of the resolver without causing the flange part located on one side of the insulator in the axial direction, the outer peripheral wall of the first coil cover, the flange part located on the other side of the insulator in the axial direction, and the outer peripheral wall of the second coil cover to be deformed. As a result, it is possible to further improve the reliability of the stator structure and the resolver.

The present invention is not limited to the above-mentioned embodiments provided that the number of the resin pins and the position of each of the resin pins are set so as to improve the reliability of the resolver due to the sufficient connection strength between the coil cover and the insulator that are connected with each other through the resin pins.

According to one embodiment of the present invention, the reliability of the resolver can be further improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A stator structure comprising:
   a stator core having a plurality of teeth extending from a body part of the stator core in a radial direction, the body part being formed in an annular shape;
   insulators configured to cover the teeth from both sides in an axial direction;
   a coil wound around each of the teeth with the insulators interposed therebetween; and
   first and second coil covers configured to cover the coil from both sides in the axial direction, each of the first and second coil covers being formed in an annular shape, wherein
   the insulators have respective flange parts configured to cover respective distal end portions of the teeth from both sides in the axial direction,
   each of the first and second coil covers has a first peripheral wall extending in the axial direction,
   the first peripheral wall of the first coil cover and the flange part located on one side of the insulators in the axial direction are arranged to face each other with a space therebetween, and
   the first peripheral wall of the second coil cover and the flange part located on the other side of the insulators in the axial direction are arranged to face each other with a space therebetween.

2. The stator structure according to claim 1, wherein
   the first peripheral wall of the first coil cover is arranged to face a stepped portion formed in the flange part located on one side of the insulators in the axial direction so as to form the space crooked between the first peripheral wall of the first coil cover and the stepped portion formed in the flange part located on one side of the insulators, and
   the first peripheral wall of the second coil cover is arranged to face a stepped portion formed in the flange part located on the other side of the insulators in the axial direction so as to form the space crooked between the first peripheral wall of the second coil cover and the stepped portion formed in the flange part located on the other side of the insulators.

3. The stator structure according to claim 1, wherein the insulators and the stator core are integrally formed with each other.

4. The stator structure according to claim 1, wherein
   the insulators include a first insulator and a second insulator,
   a pin formed in the first insulator is inserted into a hole formed in the first coil cover, the first coil cover and the first insulator being connected with each other by way of the pin formed in the first insulator, and
   a pin formed in the second insulator is inserted into a hole formed in the second coil cover, the second coil cover and the second insulator being connected with each other by way of the pin formed in the second insulator.

5. The stator structure according to claim 1, wherein
   a plurality of through holes are formed in the stator core so as to penetrate through two principal surfaces of the body part,
   the first coil cover is provided with a second peripheral wall extending from outer periphery of the first coil cover in the axial direction, and a plurality of first engagement portions extending from the second peripheral wall extending from outer periphery of the first coil cover in the axial direction,
   the second coil cover is provided with a second peripheral wall extending from the outer periphery of the second coil cover in the axial direction, and a plurality of second engagement portions extending from the second peripheral wall extending from outer periphery of the second coil cover in the axial direction, and
   the first engagement portions and the second engagement portions are engaged with each other through the respective through holes.

6. The stator structure according to claim 1, wherein
   each of the first coil cover and the second coil cover has a plurality of projection portions arranged in respective spaces formed between distal ends of the teeth, and
   a distal end of each of the projection portions of the first coil cover and a distal end of each of the projection portions of the second coil cover have respective stepped portions facing each other.

7. The stator structure according to claim 1, wherein ribs are formed in respective inner peripheral faces of the projection portions of the first coil cover and respective inner peripheral faces of the projection portions of the second coil cover.

8. The stator structure according to claim 1, further comprising:
- a terminal block part configured to extend from the insulators in the radial direction of the stator core;
- a plurality of terminals provided to the terminal block part, an end of a winding that constitutes the coil being twined around each of the terminals; and
- a terminal block cover part provided to the first coil cover, the terminal block cover part covering the terminal block part, wherein
the terminal block cover part has a plurality of separation members arranged inside the terminal block cover part, and
the terminals are housed in respective spaces formed by the separation members in a spaced-apart manner.

9. A resolver comprising:
a rotor; and
a stator structure that comprises
  a stator core having a plurality of teeth extending from a body part of the stator core in a radial direction, the body part being formed in an annular shape;
  insulators configured to cover the teeth from both sides in an axial direction;
  a coil wound around each of the teeth with the insulators interposed therebetween; and
  first and second coil covers configured to cover the coil from both sides in the axial direction, each of the first and second coil covers being formed in an annular shape, wherein
the insulators have respective flange parts configured to cover respective distal end portions of the teeth from both sides in the axial direction,
each of the first and second coil covers has a first peripheral wall extending in the axial direction,
the first peripheral wall of the first coil cover and the flange part located on one side of the insulators in the axial direction are arranged to face each other with a space therebetween, and
the first peripheral wall of the second coil cover and the flange part located on the other side of the insulators in the axial direction are arranged to face each other with a space therebetween.

* * * * *